United States Patent
Mu et al.

(10) Patent No.: US 10,975,294 B2
(45) Date of Patent: Apr. 13, 2021

(54) INJECTION STIMULATION AGENT FOR WATER INJECTION WELL AND THE PREPARATION METHOD AND APPLICATION THEREOF

(71) Applicant: PetroChina Company Limited, Beijing (CN)

(72) Inventors: Lijun Mu, Beijing (CN); Xianwen Li, Beijing (CN); Hongjun Lu, Beijing (CN); Yong Wang, Beijing (CN); Bin Yao, Beijing (CN); Zhenning Ji, Beijing (CN); Suiwang Zhang, Beijing (CN); Xiaobing Lu, Beijing (CN); Zhaojie Song, Beijing (CN); Lei Sui, Beijing (CN); Zhiying Deng, Beijing (CN); Erzhen Wang, Beijing (CN); Wei Wang, Beijing (CN); Juntao Wang, Beijing (CN)

(73) Assignee: PetroChina Company Ltd.

( * ) Notice: Subject to any disclaimer, the term of this patent is extended or adjusted under 35 U.S.C. 154(b) by 69 days.

(21) Appl. No.: 16/229,602

(22) Filed: Dec. 21, 2018

(65) Prior Publication Data

US 2019/0316031 A1    Oct. 17, 2019

(30) Foreign Application Priority Data

Apr. 16, 2018  (CN) .......................... 201810336318.5

(51) Int. Cl.
  *C09K 8/74*   (2006.01)
  *C09K 8/72*   (2006.01)
  *E21B 43/20*  (2006.01)

(52) U.S. Cl.
  CPC ............... *C09K 8/725* (2013.01); *C09K 8/74* (2013.01); *E21B 43/20* (2013.01)

(58) Field of Classification Search
  CPC ...... C09K 8/725; C09K 8/74; C09K 2208/12; C09K 8/88; C09K 8/528; C09K 8/588; C09K 2208/26; C09K 8/50; C09K 8/536; C09K 8/68; C09K 8/70; C09K 8/706; C09K 8/72; C09K 8/80; C09K 8/805; C09K 8/885; C09K 8/92; E21B 43/20; E21B 43/16; E21B 37/06; E21B 43/25; E21B 43/26; E21B 43/267
  See application file for complete search history.

(56) References Cited

U.S. PATENT DOCUMENTS

| | | | |
|---|---|---|---|
| 2010/0276152 A1* | 11/2010 | De Wolf | C11D 7/265 166/308.2 |
| 2013/0213657 A1 | 8/2013 | Dobson, Jr. et al. | |
| 2016/0139588 A1* | 5/2016 | Huang | E21B 43/26 700/275 |
| 2017/0335174 A1* | 11/2017 | Blattel | C09K 8/725 |
| 2017/0342314 A1* | 11/2017 | Ndong | E21B 41/02 |

FOREIGN PATENT DOCUMENTS

| | | |
|---|---|---|
| CN | 101538461 A | 9/2009 |
| CN | 103421478 A | 12/2013 |
| CN | 105602540 A | 5/2016 |
| CN | 106281288 A | 1/2017 |

OTHER PUBLICATIONS

Product datasheet Reephos Chemical, http://reephos.com/eng/news_Detail.aspx?n_id=2593 dated Mar. 26, 2014, downloaded on Aug. 19, 2020.*
Chinese "Novelty Search Report", dated Apr. 11, 2018, for co-pending Chinese Patent Application No. 2018103363185 and English translation of cited documents.
Yarong, F. U., "Indoor study of chemical agents for injection well stimulation [J]", Oil Drilling & Production Technology. (Oct. 2009), 31(5)77-80, with English Abstract.
First Office Action dated Mar. 23, 2020, for counterpart Chinese Patent Application No. 201810336318.5, with machine translation.
Search Report dated Mar. 23, 2020, for counterpart Chinese Patent Application No. 201810336318.5, with machine translation.

* cited by examiner

Primary Examiner — Kumar R Bhushan
(74) Attorney, Agent, or Firm — Weaver Austin Villeneuve & Sampson LLP

(57) ABSTRACT

An injection stimulation agent for water injection well and the preparation method and application thereof are described. The raw material composition of the injection stimulation agent for water injection well comprises: 5.0%-10.0% of sulfamic acid, 10.0%-20.0% of methanol, 10.0%-20.0% of tartaric acid, 10.0%-20.0% of ethylenediamine tetramethylene phosphoric acid, 5.0%-10.0% of sodium polyacrylate, 5.0%-8.0% of cocoyl hydroxyethyl sulfonic acid and the balance of water. Embodiments include a preparation method of the above injection stimulation agent. The injection stimulation agent for water injection well can be used in acidizing treatment process of the reservoir, and can be used directly. The injection stimulation agent can play the role of shrinking swelled clay at the same time of dissolving scale, and finally achieve the purpose of depressurization and enhanced production.

7 Claims, No Drawings

INJECTION STIMULATION AGENT FOR WATER INJECTION WELL AND THE PREPARATION METHOD AND APPLICATION THEREOF

TECHNICAL FIELD

The invention relates to an injection stimulation agent for water injection well, in particular to an injecting stimulation agent capable of dissolving scale, shrinking swelled clay and depressurizing, belonging to the technical field of petroleum exploitation.

BACKGROUND

Due to changes in pressure, temperature and other conditions, as well as thermodynamic instability and chemical incompatibility of water, when the oil field enters the mid-to-late development of water injection development, it usually causes scaling in water injection formations, oil casings, down holes, ground equipment, and gathering lines. And the clay mineral in the reservoir adsorbs the injected water to expanding, thereby reducing the reservoir damage caused by the pore permeability of the reservoir, which may cause great damage to the low permeability layer and reduce the permeability of the reservoir, increase the inter-layer permeability difference and increase the inter-layer contradiction, resulting in high water injection pressure in the water injection well, difficult to injecting, resulting in decreased oil and gas production, increased water injection pressure, shutting down the down hole and ground equipment and even oil and gas wells.

Therefore, it is urgent to develop a new type of injection stimulation agent for water injection well that capable of dissolving scale, shrinking swelled clay and depressurizing, which can also play the role of shrinking swelled clay at the same time of dissolving scale, and finally achieve the purpose of depressurization and enhanced production.

SUMMARY

In order to achieve the above technical object, the present invention provides an injection stimulation agent, which can be directly used in a water injection well, and can also play a role of shrinking swelled clay at the same time of dissolving scale, and finally achieves the purpose of depressurization and increasing production.

The invention provides an injection stimulation agent for water injection well, the raw material composition of the injection stimulation agent for water injection well comprises: 5.0%-10.0% of sulfamic acid, 10.0%-20.0% of methanol, 10.0%-20.0% of tartaric acid, 10.0%-20.0% of ethylenediamine tetramethylene phosphoric acid, 5.0%-10.0% of sodium polyacrylate, 5.0%-8.0% of cocoyl hydroxyethyl sulfonic acid and the balance of water, based on 100% of the total mass percentage of each raw material of the injection stimulation agent for water injection well.

In the injection stimulation agent for water injection well of the present invention, preferably, after injection of the injection stimulation agent for water injection well, the surface interfacial tension of the reservoir is as small as $10^{-3}$ mN/m, the swelling reduction rate is greater than 80%, and the shrinkage rate for swelled clay is greater than 60%.

In above injection stimulation agent for water injection well of the present invention, preferably, the injection stimulation agent for water injection well has 8% of sulfamic acid in its raw material composition.

In above injection stimulation agent for water injection well of the present invention, preferably, the injection stimulation agent for water injection well has 15% of methanol in its raw material composition.

In above injection stimulation agent for water injection well of the present invention, preferably, the injection stimulation agent for water injection well has 18% of tartaric acid in its raw material composition.

In above injection stimulation agent for water injection well of the present invention, preferably, the injection stimulation agent for water injection well has 16% of ethylenediamine tetramethylene phosphoric acid in its raw material composition.

In above injection stimulation agent for water injection well of the present invention, preferably, the injection stimulation agent for water injection well has 8% of sodium polyacrylate in its raw material composition.

In above injection stimulation agent for water injection well of the present invention, preferably, the relative molecular mass of the sodium polyacrylate used is 1000-3000.

In above injection stimulation agent for water injection well of the present invention, preferably, the injection stimulation agent for water injection well has 5.0% of cocoyl hydroxyethyl sulfonic acid in its raw material composition.

The invention also provides a preparation method for the injection stimulation agent for water injection well, comprising the following steps:

adding successively tartaric acid, ethylenediamine tetramethylene phosphoric acid, sodium polyacrylate, cocoyl hydroxyethyl sulfonic acid and water to sulfamic acid at 15° C. to 25° C., and stirring the mixture (at low and uniformed stirring speed) uniformly;

then adding methanol to the mixture, and stirring the resultant (1 at low and uniformed stirring speed) uniformly to obtain the injection stimulation agent for water injection well.

The injection stimulation agent for water injection well of the present invention can be used in the acidizing treatment process of the reservoir; preferably, the specific step comprises: adding the injection stimulation agent for water injection well into the acid solution, and the addition amount of the injection stimulation agent for water injection well is 0.1% or more of the volume of the acid solution.

The above injection stimulation agent for water injection well of the present invention can be used in the acidizing treatment process of the reservoir. When the injection stimulation agent for water injection well is used in the acidizing treatment process of the reservoir, it can be directly added to the acid solution, and the addition amount of the injection stimulation agent for the water injection well is 0.1% of the volume of the acid solution, and can also be increased to an appropriate amount as needed. Acidification is performed by incorporating conventional acid solution, which can remove blockages such as calcium carbonate scale, calcium sulfate scale and barium sulfate scale caused by incompatibility between injected water and formation water, prevent water sensitivity and rapid sensitivity of the reservoir, and reduce the interfacial tension of the oil-water to $10^{-3}$ mN/m, greatly reducing the capillary resistance, greatly reducing the deformation work of the oil droplets in the porous medium from the rock surface, increasing its moving speed in the formation pores, avoiding the damage caused by clay minerals swelling in water and transporting to the formation.

When the injection stimulation agent for water injection well of the present invention is added at a concentration of 0.1% (of volume of the acid solution), it can efficiently chelate metal ions such as metal $Ca^{2+}$, $Mg^{2+}$, $Ba^{2+}$, $Sr^{2+}$, $Fe^{3+}$, and avoid the formation of precipitations such as calcium carbonate scale, calcium sulfate scale, barium sulfate, iron hydroxide and the like.

The injection stimulation agent for water injection well of the present invention can be directly added into the water injection pipeline according to the on-site operation requirements, and does not need to be prepared at the operation site.

When the injection stimulation agent for water injection well of the present invention is added at a concentration of 0.1%, it can effectively reduce the surface interfacial tension of the reservoir, and the surface interfacial tension can be as small as $10^{-3}$ mN/m.

When the injection stimulation agent for water injection well of the present invention is added at a concentration of 0.1%, it can effectively alleviate the swelling of clay during the development of water injection, and play the role of swelling reduction and shrinking swelled clay, wherein, the swelling reduction rate is greater than 80%, the volume shrinkage rate for swelled clay is greater than 60%.

The injection stimulation agent for water injection well of the present invention is an injection stimulation agent for dissolving scale, shrinking swelled clay and depressurizing for water injection wells. In the process of water injection development, acidification is performed with conventional acid solution, which can remove blockages such as calcium carbonate scale, calcium sulfate scale and barium sulfate scale caused by incompatibility between injected water and formation water, prevent water sensitivity and rapid sensitivity of the reservoir, and reduce the interfacial tension of the oil-water to $10^{-3}$ mN/m, greatly reducing the capillary resistance, greatly reducing the deformation work of the oil droplets in the porous medium from the rock surface, increasing its moving speed in the formation pores, avoiding the damage caused by clay minerals swelling in water and transporting to the formation, and further improving the effect of development of water flooding.

DETAILED DESCRIPTION

In order to understand the technical features, objects, and advantages of the present invention more clearly, the technical solutions of the present invention are described in detail below, which however should not to be construed as limiting the scope of the invention.

Example 1

The present example provides an injection stimulation agent for water injection well, the raw material composition of the injection stimulation agent for water injection well comprises: 8.0% of sulfamic acid, 12.0% of methanol, 15.0% of tartaric acid, 12.0% of ethylenediamine tetramethylene phosphoric acid, 8.0% of sodium polyacrylate, 5% of cocoyl hydroxyethyl sulfonic acid and the balance of water.

The above injection stimulation agent for water injection well is prepared by the following steps:
adding successively tartaric acid, ethylenediamine tetramethylene phosphoric acid, sodium polyacrylate, cocoyl hydroxyethyl sulfonic acid and water to sulfamic acid at 15° C. to 25° C., and stirring the mixture, then adding methanol to the mixture, and stirring the resultant to obtain the injection stimulation agent for water injection well.

The above injection stimulation agent of the example was tested indoor for its swelling reduction rate, the volume shrinkage rate for swelled clay, and the reduction of the oil-water interfacial tension, and the experimental data is as follows.

(1) Evaluation of Surface and Interfacial Tension

Surface tension test: using automatic surface tension meter K100;

Interfacial tension test: using a rotating drop interface tension contact angle measuring instrument.

Different concentrations of depressurizing injection stimulation agents were prepared, wherein the raw material composition of the composite acid solution is 10% of ammonium fluoride, 20% of hydrochloric acid, 5% of corrosion inhibitor and the balance of water. Surface and interfacial tension tests were carried out using the above instruments. The test results are shown in Table 1:

TABLE 1

| Percentage of total agent | | | | |
|---|---|---|---|---|
| composite acid solution | injection stimulation agent | Corrosion ratio(%) | Surface tension (mN/m) | Interfacial tension (mN/m) |
| 20% | 0.1% | 16.5 | 28.92 | 0.047 |

(2) The Swelling Reduction Rate and the Volume Shrinkage Rate for Swelled Clay Tests The evaluation of the swelling reduction performance was carried out in accordance with the petroleum industry standard of SY/T 5971-94 "Evaluation Method for Performance of Clay Stabilizer for Water Injection", and the test results are shown in Table 2.

TABLE 2

| Percentage of total agent | | | |
|---|---|---|---|
| composite acid solution | injection stimulation agent | swelling reduction rate(%) | volume shrinkage rate for swelled clay(%) |
| 20% | 0.1% | 86 | 62 |

The above injection stimulation agent of the present example is added to the on-line acidification system (the raw material composition thereof comprises: 10% of ammonium fluoride, 20% of hydrochloric acid, 5% of corrosion inhibitor and the balance of water) (addition amount of the injection stimulation agent is 0.1% of the total amount of the on-line acidification system) to form an on-line chelation acid system. Operation on two wells in Changqing Oilfield was performed. The implementation effect are shown in Table 3.

TABLE 3

Data of Changqing Oilfield on-site operation

| Well number | Pre-operation | | | | Post-operation | | | | Effective days (d) |
|---|---|---|---|---|---|---|---|---|---|
| | Oil pressure (MPa) | Casing pressure (MPa) | Injection allocation (m³) | Daily injection (m³) | Oil pressure (MPa) | Casing pressure (MPa) | Injection allocation (m³) | Daily injection (m³) | |
| H48-32 | 20.0 | 19.2 | 20.0 | 10.0 | 15.0 | 14.8 | 25.0 | 25.0 | 335 |
| H63-21 | 18.5 | 18.1 | 18.0 | 8.0 | 13.5 | 12.8 | 18.0 | 18.0 | 306 |

The operation results show that after adding above injection stimulation agent of the present example, it can effectively remove the blockage of the injection well formation, improve the fluid flow condition of the formation, improve the water injection capacity of the injection well, and reduce the injection pressure, and has good practical application value.

Example 2

The present example provides an injection stimulation agent for water injection well, the raw material composition of the injection stimulation agent for water injection well comprises: 10.0% of sulfamic acid, 15.0% of methanol, 12.0% of tartaric acid, 15.0% of ethylenediamine tetramethylene phosphoric acid, 6.0% of sodium polyacrylate, 7% of cocoyl hydroxyethyl sulfonic acid and the balance of water.

The above injection stimulation agent for water injection well is prepared by the following steps:

adding successively tartaric acid, ethylenediamine tetramethylene phosphoric acid, sodium polyacrylate, cocoyl hydroxyethyl sulfonic acid and water to sulfamic acid at 15° C. to 25° C., and stirring the mixture, adding methanol to the mixture, and stirring the resultant to obtain the injection stimulation agent for water injection well.

The above injection stimulation agent of the example was tested indoor for its swelling reduction rate, the volume shrinkage rate for swelled clay, and the reduction of the oil-water interfacial tension, and the experimental data is as follows.

(1) Evaluation of Surface and Interfacial Tension

Surface tension test: using automatic surface tension meter K100;

Interfacial tension test: using a rotating drop interface tension contact angle measuring instrument.

Different concentrations of depressurizing injection stimulation agents were prepared. Surface and interfacial tension tests were carried out using the above instruments. The test results are shown in Table 4:

TABLE 4

| Percentage of total agent | | | | |
|---|---|---|---|---|
| composite acid solution | injection stimulation agent | Corrosion ratio(%) | Surface tension (mN/m) | Interfacial tension (mN/m) |
| 20% | 0.1% | 16.5 | 30.25 | 0.036 |

(2) The Swelling Reduction Rate and the Volume Shrinkage Rate for Swelled Clay Tests The evaluation of the swelling reduction performance was carried out in accordance with the petroleum industry standard of SY/T 5971-94 "Evaluation Method for Performance of Clay Stabilizer for Water Injection", and the test results are shown in Table 5.

TABLE 5

| Percentage of total agent | | | |
|---|---|---|---|
| composite acid solution | injection stimulation agent | swelling reduction rate(%) | volume shrinkage rate for swelled clay(%) |
| 20% | 0.1% | 89 | 65 |

The above injection stimulation agent of the present example is added to the on-line acidification system to form an on-line chelation acid system. Operation of two wells in Changqing Oilfield was performed. The implementation effect are shown in Table 6.

TABLE 6

Data of Changqing Oilfield on-site operation

| Well number | Pre-operation | | | | Post-operation | | | | Effective days (d) |
|---|---|---|---|---|---|---|---|---|---|
| | Oil pressure (MPa) | Casing pressure (MPa) | Injection allocation (m³) | Daily injection (m³) | Oil pressure (MPa) | Casing pressure (MPa) | Injection allocation (m³) | Daily injection (m³) | |
| X86-44 | 21.5 | 20.5 | 25.0 | 15.0 | 16.0 | 15.8 | 25.0 | 25.0 | 452 |
| X35-55 | 20.5 | 20.2 | 20.0 | 5.0 | 16.5 | 15.8 | 20.0 | 22.0 | 429 |

The operation results show that after adding the above injection stimulation agent of the present example, it can effectively remove the blockage of the injection well formation, improve the fluid flow condition of the formation, improve the water injection capacity of the injection well, and reduce the injection pressure, and has good practical application value.

The invention claimed is:

1. An injection stimulation agent for mid-to-late development of water injection well, characterized in that the raw material composition of the injection stimulation agent for water injection well comprises: 5.0%-10.0% of sulfamic acid, 10.0%-20.0% of methanol, 10.0%-20.0% of tartaric acid, 10.0%-20.0% of ethylenediamine tetramethylene phosphoric acid, 5.0%-10.0% of sodium polyacrylate, 5.0%-8.0% of cocoyl hydroxyethyl sulfonic acid and the balance of water, based on 100% of the total mass percentage of each raw material of the injection stimulation agent for water injection well wherein a relative molecular mass of the sodium polyacrylate is 1000-3000.

2. The injection stimulation agent according to claim 1, characterized in that the injection stimulation agent for water injection well has 8% of sulfamic acid in its raw material composition.

3. The injection stimulation agent according to claim 1, characterized in that the injection stimulation agent for water injection well has 15% of methanol in its raw material composition.

4. The injection stimulation agent according to claim 1, characterized in that the injection stimulation agent for water injection well has 18% of tartaric acid in its raw material composition.

5. The injection stimulation agent according to claim 1, characterized in that the injection stimulation agent for water injection well has 16% of ethylenediamine tetramethylene phosphoric acid in its raw material composition.

6. The injection stimulation agent according to claim 1, characterized in that the injection stimulation agent for water injection well has 8% of sodium polyacrylate in its raw material composition.

7. The injection stimulation agent according to claim 1, characterized in that the injection stimulation agent for water injection well has 5.0% of cocoyl hydroxyethyl sulfonic acid in its raw material composition.

* * * * *